Patented Apr. 10, 1945

2,373,454

UNITED STATES PATENT OFFICE 2,373,454

METHOD OF PREPARING TETANUS TOXIN

William Edward Bunney, Millstone, and Walter Ludwig Koerber, Milltown, N. J., assignors to E. R. Squibb & Sons, New York, N. Y., a corporation of New York No Drawing. Application July 9, 1943, Serial No. 494,076

7 Claims. (Cl. 167—78)

This invention relates to the preparation of agents for the prophylaxis and therapy of tetanus.

Tetanus, or lockjaw, is an infectious disease caused by certain anaerobic bacteria. Immunization against this disease is effected with tetanus toxoid, which is the non-toxic product obtained by incubating *Clostridium tetani* in a suitable medium, separating the tetanus toxin formed, and treating the toxin with formaldehyde; and from the serum of horses immunized by repeated injections of tetanus toxin, an antitoxin is obtained which is useful in both the prophylaxis and the therapy of tetanus.

It is an object of this invention to provide a method of preparing improved tetanus toxins; and, further, a method of preparing improved tetanus toxoids.

In 1917, Douglas, Fleming, and Colebrook (Lancet II, 530–532) observed that a medium to which activated charcoal had been added was rendered suitable for the growth of anaerobic bacilli without any further precautions as to anaeric conditions; and they also noted that more rapid growth of *Clostridium tetani* was obtained in liquid media containing charcoal.

It has now been found that the presence of activated charcoal (active carbon) in peptone-containing media during the growth of *Clostridium tetani* not only influences its growth, but also favorably influences the combining power (L+/ml.) of its most important metabolite, the tetanus toxin. Thus, toxins prepared in this manner show exceptionally high values of combining power (and the toxoids obtained therefrom show increased antigenicity) as compared with control toxins prepared in the absence of activated charcoal. The desirability of higher antigenicity in tetanus toxoids is obvious.

In general, the method of this invention comprises incubating *Clostridium tetani* in a liquid peptone-containing medium in the presence of a small proportion (say, about 0.1–1.0% by weight) of activated charcoal, and separating the toxin from the charcoal and organisms. The optimal proportion of charcoal is about 0.2% by weight. Preferably, the charcoal is sterilized with hot air prior to its introduction into the medium. Preferably also, the pressure above the medium is continuously or periodically reduced during the incubation period.

The following examples are illustrative of the invention:

*Example 1*

(*a*) Activated charcoal (e. g., Nuchar, C–115, neutral) is sterilized twice with air heated to 160–180° C., and added to the extent of 0.2% by weight to a peptone broth [cf. "A compilation of culture media for the cultivation of microorganisms" by Levine and Schoenlein, published by Williams and Wilkins Co., Baltimore, 1930 (Monographs on systematic bacteriology, v. 2); No. 748, page 214]; and the charcoal-containing medium is sterilized for 20 minutes at 15 lb. pressure in 3-liter Erlenmeyer flasks containing 2700 ml. medium. After cooling, the medium is seeded with a selected strain of *Clostridium tetani*, and incubated for 10–12 days at 35° C. (The charcoal stays suspended throughout the medium during the whole incubation period and gives the flasks an opaque appearance.) At the end of the incubation period, the charcoal and organisms are removed by filtration through paper pulp pads or by centrifugation, followed by filtration through 13-lb. Berkefeld candles. Samples of the thus-obtained toxin in peptone diluent, when tested in guinea pigs, exhibit a combining power about twice that of a control toxin prepared without the use of activated charcoal.

(*a*) The toxin obtained as described in (*a*) is converted into a toxoid by adding 0.2–0.3% formalin, incubating at 37° C. for three weeks, treating the toxoid solution with a sterile solution of alum until complete precipitation is obtained, and resuspending the precipitate in physiological salt solution. Samples of the toxoid thus obtained have about twice the antigenic power of a provisional standard tetanus toxoid, as compared with a control toxoid (made from a toxin simultaneously prepared on the identical medium and with the same strain of organism, but without charcoal), which has about the same antigenic power as the standard. Moreover, the toxoid is colorless, owing to the removal of colored matter from the medium by the charcoal.

*Example 2*

The procedure of Example 1(*a*) is followed, except that the medium is replaced by Martin's stomach-digest infusion broth (cf. No. 1006, page 311 of the Levine and Schoenlein monograph referred to hereinbefore). Samples of the toxin thus obtained exhibit about twice the combining power of the corresponding control; and the toxoid obtained therefrom, following the procedure of Example 1(b), has about twice the antigenic power of a provisional standard tetanus toxoid, as compared with a control toxoid, which has about the same antigenic power as the standard.

Example 3

The procedure of Example 1(a) is followed, except that the medium is replaced by Martin's stomach-digest infusion broth, the flasks are placed in a vacuum chamber in an incubator kept at 35° C., and the pressure above the medium is reduced twice daily to about 100–200 mm. Samples of the toxin thus obtained exhibit about four times the combining power of the corresponding control (with no charcoal and no evacuation). The toxoid obtained from this toxin, following the procedure of Example 1(b), has a correspondingly high antigenic power.

The improved toxins obtained in accordance with the foregoing examples may be used advantageously for the production of antitoxins; thus, an efficacious antitoxin may be obtained (in the conventional manner) by refining and concentrating the serum of horses immunized by repeated injections of these improved tetanus toxins (after a preliminary injection of a tetinus toxoid).

Also, the method of this invention may be employed in the preparation of combined tetanus and gas-gangrene antitoxin; e. g., by immunizing horses with gas-gangrene toxins and the improved tetanus toxin of this invention. Furthermore, the improved toxoid of this invention may be used for the preparation of a combined liquid or alum - precipitated tetanus - perfringens (Welchii) toxoid for human use.

Other activated charcoals (active carbons) may be employed instead of Nuchar in the procedure of the foregoing examples, inter alia, Darco and Norite.

The invention may be variously otherwise embodied within the scope of the appended claims.

We claim:

1. The method of preparing a tetanus toxin which comprises incubating *Clostridium tetani* in a liquid peptone-containing medium in the presence of a small proportion of activated charcoal, and separating the toxin from the charcoal and organisms.

2. The method of preparing a tetanus toxin which comprises incubating *Clostridium tetani* in a liquid peptone-containing medium in the presence of a small proportion of a hot-air-sterilized activated charcoal, and separating the toxin from the charcoal and organisms.

3. The method of preparing a tetanus toxin which comprises incubating *Clostridium tetani* in a liquid peptone-containing medium in the presence of about 0.1–1.0% by weight of activated charcoal, and separating the toxin from the charcoal and organisms.

4. The method of preparing a tetanus toxin which comprises incubating *Clostridium tetani* in a liquid peptone-containing medium in the presence of about 0.2% by weight of activated charcoal, and separating the toxin from the charcoal and organisms.

5. The method of preparing a tetanus toxin which comprises incubating *Clostridium tetani* in a peptone broth in the presence of a small proportion of activated charcoal, and separating the toxin from the charcoal and organisms.

6. The method of preparing a tetanus toxin which comprises incubating *Clostridium tetani* in a stomach-digest infusion broth in the presence of a small proportion of activated charcoal, and separating the toxin from the charcoal and organisms.

7. The method of preparing a tetanus toxin which comprises incubating *Clostridium tetani* in a liquid peptone-containing medium in the presence of a small proportion of activated charcoal, reducing the pressure above the medium during the incubation, and separating the toxin from the charcoal and organisms.

WILLIAM EDWARD BUNNEY.
WALTER L. KOERBER.